(12) United States Patent
Font et al.

(10) Patent No.: US 9,487,431 B2
(45) Date of Patent: Nov. 8, 2016

(54) METHOD FOR REPLACING CUTTING MEMBERS

(75) Inventors: Dominique Font, Saint Baldoph (FR); Gerard Veuillen, Barberez Chambery (FR)

(73) Assignee: OCV Intellectual Capital, LLC, Toledo, OH (US)

( * ) Notice: Subject to any disclaimer, the term of this patent is extended or adjusted under 35 U.S.C. 154(b) by 1719 days.

(21) Appl. No.: 11/719,656

(22) PCT Filed: Nov. 9, 2005

(86) PCT No.: PCT/FR2005/050939
§ 371 (c)(1),
(2), (4) Date: Apr. 17, 2009

(87) PCT Pub. No.: WO2006/054012
PCT Pub. Date: May 26, 2006

(65) Prior Publication Data
US 2009/0205469 A1    Aug. 20, 2009

(30) Foreign Application Priority Data
Nov. 19, 2004  (FR) ..................................... 04 52700

(51) Int. Cl.
*C03B 37/16*  (2006.01)
*D01G 1/04*  (2006.01)

(52) U.S. Cl.
CPC ................. *C03B 37/16* (2013.01); *D01G 1/04* (2013.01); *Y02P 40/57* (2015.11); *Y10S 83/913* (2013.01); *Y10S 83/95* (2013.01); *Y10T 83/04* (2015.04);

(Continued)

(58) Field of Classification Search
CPC ........ C03B 37/16; D01G 1/04; Y10T 83/04; Y10T 83/0433; Y10T 83/0438; Y10T 83/6648; Y10T 83/8732; Y10T 83/8748; Y10T 83/8749; Y10S 83/913; Y10S 83/95
USPC ............ 83/13, 913, 950, 20, 21, 436.6, 552, 83/563, 564
See application file for complete search history.

(56) References Cited

U.S. PATENT DOCUMENTS 3,869,268 A * 3/1975 Briar et al. ..................... 65/452
4,344,786 A * 8/1982 Symborski et al. ............ 65/480

(Continued)

OTHER PUBLICATIONS

Office action from Indian Application No. 1559/KOLNP/2007 dated Aug. 7, 2014.

(Continued)

*Primary Examiner* — Clark F Dexter
(74) *Attorney, Agent, or Firm* — Calfee, Halter & Griswold LLP

(57) ABSTRACT

A method enabling maintenance intervention on a chopping machine. In the method at least one strand is drawn through a first chopping assembly in operation, the first chopping assembly including a first chopping wheel and a first anvil wheel, the first chopping assembly being secured to a chassis mounted to move about an axle. The chassis is rotated about its axle until a second chopping assembly initially in a position of non-operation is brought into the vicinity of the strand, the second chopping assembly being secured to the chassis and including a second chopping wheel and a second anvil wheel. The second chopping assembly is set in operation and the strand is led in between the second chopping wheel and the second anvil wheel. The first chopping assembly is brought into the position of non-operation.

5 Claims, 8 Drawing Sheets

Figure 1:
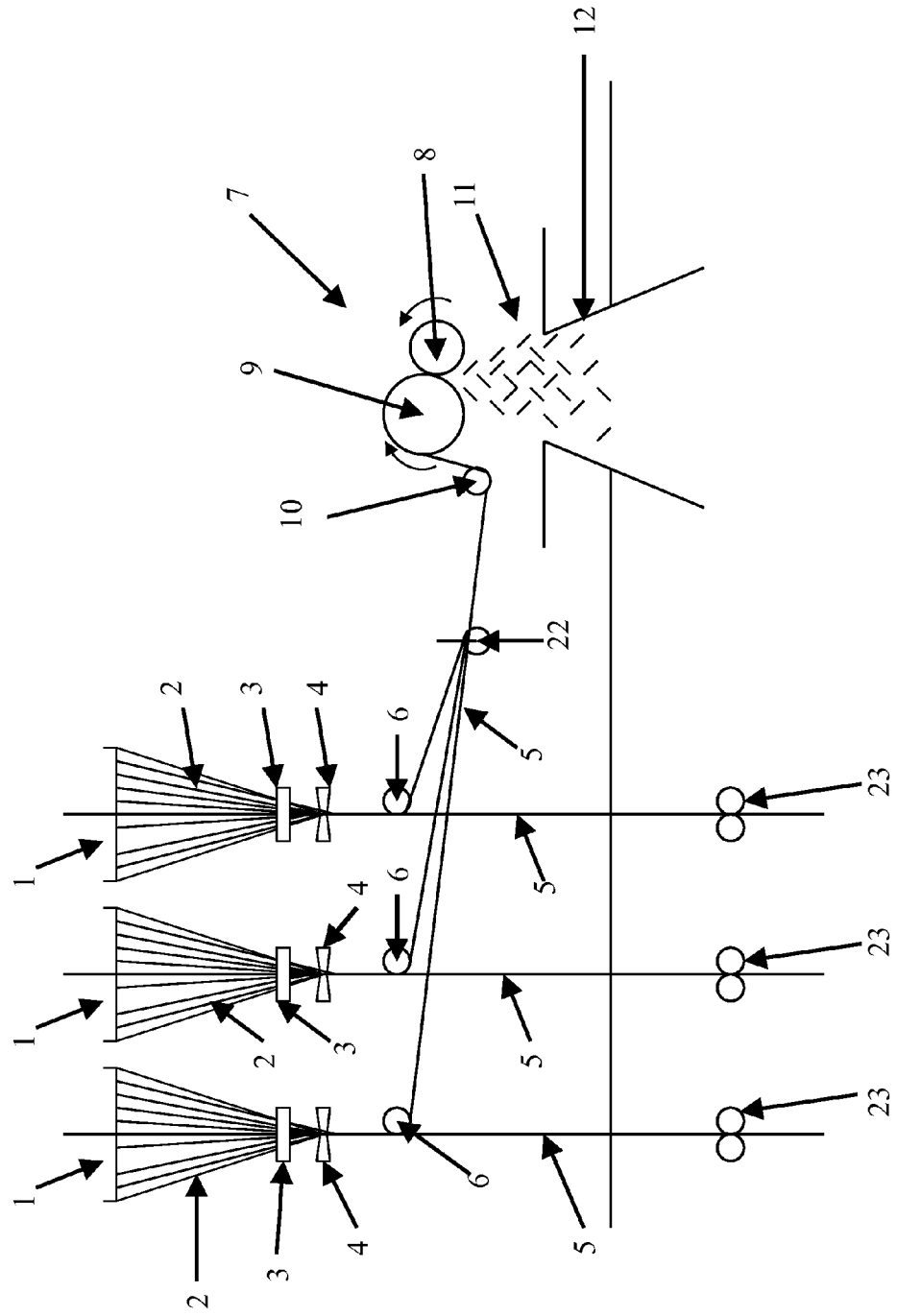

(52) U.S. Cl.
CPC ......... *Y10T 83/0433* (2015.04); *Y10T 83/0438* (2015.04); *Y10T 83/6648* (2015.04); *Y10T 83/8732* (2015.04); *Y10T 83/8748* (2015.04); *Y10T 83/8749* (2015.04)

(56) References Cited

U.S. PATENT DOCUMENTS

| | | | | |
|---|---|---|---|---|
| 5,935,289 | A | * | 8/1999 | Arterburn et al. ...... C03B 37/02 226/91 |
| 5,970,837 | A | * | 10/1999 | Arterburn et al. ...... C03B 37/16 29/40 |
| 6,076,442 | A | | 6/2000 | Arterburn et al. |
| 6,148,640 | A | * | 11/2000 | Hendrickson et al. . C03B 37/16 264/145 |

OTHER PUBLICATIONS

Office action from Korean Application No. 10-207-7011285 dated Aug. 24, 2012.
Office action from Brazilian Application No. PI0518351-0 dated Feb. 23, 2016 along with English translation of relevant portions of action.
Office action from Brazilian Application No. PI0518351-0 dated Sep. 17, 2015.

* cited by examiner

METHOD FOR REPLACING CUTTING MEMBERS

The present invention relates to the field of the manufacture of chopped strands for technical use, particularly strands of thermoplastic and especially glass strands.

It relates more specifically to a method enabling a maintenance intervention to be performed, it being possible for this maintenance intervention for example to consist of an operation of changing the chopping members, cleaning, or to consist of any other operation that has to be carried out without the need to interrupt the production process and to a device enabling this method to be implemented.

Within the meaning of the invention, the expression "without the need to interrupt the production process" is a phase in production during which the bushings produce filaments which are directed to the chopper (rather than going for scrap) even though, during this phase, the chopping machine might produce chopped strands that are unsuitable for sale as a finished product.

Numerous devices capable of manufacturing in this way are known. These systems generally comprise at least one bushing from which glass strands are drawn and led into a chopping device consisting, for example, of a backup roll or anvil wheel collaborating with a chopping roll equipped with blades distributed uniformly at its periphery.

The chopping roll is arranged in such a way as to come into contact, under pressure, with the circumferential surface of the backup roll, thus defining a chopping region. During the operation of chopping the glass fiber, the chopping wheel, once it has been in use for a certain period of time, reaches a level of wear which is such that the quality of the chopped strands no longer meets the production requirements and has therefore to be changed.

There are therefore regular production stoppages on the bushings, so that a maintenance operation such as, for example, the replacement of worn wheels, can be carried out.

These production stoppages lead to a loss in productivity in at least two respects: during the phase of changing the chopping members on the chopping machine, all of the production of filaments goes for scrap, and when this maintenance operation is carried out it is necessary, in order to regain nominal chopped-strand production, to prepare each bushing individually and perform a restart operation for each of them. A restart phase is defined as an operation which consists in reestablishing the continuity of the web of filaments between the bushing and the chopper.

A first solution aimed at reducing productivity losses is to associate at least one chopping machine with one bushing or a small number of bushings. This solution offers the advantage of nonetheless ensuring a reduced production of chopped strands from those chopping machines that remain operational during the maintenance phase being performed on one of them, but on the other hand, this solution is limited in terms of its bulk. Associating one chopper with one bushing requires there to be enough space near the bushings for the maintenance and restart operations performed by the user. In addition, it is noted that the predictable increase in productivity (the flow rate) limits the introduction of an additional chopping machine (because of problems of physically incorporating it into an existing line).

A second solution is to use so-called "double-head" chopping machines. This solution is described for example in document EP 0 849 381 and consists in considering on a single machine, two production heads alternately either in production or in maintenance mode. The advantage here being that the chopping unit is already equipped with a set of new wheels and that by simply rotating the machine (about a vertical axis) the chopping members are changed in a relatively shorter space of time because there is no longer a need to remove and refit the wheels while the bushings are shut down.

Nonetheless although the changing of the chopping members is done in parallel time, there still remains a time for which the production from all the bushings is sent for scrap during the operation of pivoting of the machine and during the restart phases.

A third solution described in documents FR0310046 and U.S. Pat. No. 6,148,640 has been imagined; it consists in positioning upstream of the chopping machine a drawing machine which continues to draw out the filaments while the operators are turning the chopping machine, thus limiting the undesirable effects particularly in terms of the thermal stability of the bushings or in terms of malfunctioning at the supply duct.

The present invention proposes a solution to the problems mentioned hereinabove by proposing a method that enables a maintenance operation to be performed on the chopping machine, such as the changing of chopping members for example, without the need to interrupt the production process.

According to the invention the method enabling a maintenance intervention to be carried out on a chopping machine, in particular enabling the chopping members of a chopping machine to be changed, is characterized in that at least one strand is drawn through a first chopping assembly in operation, said first chopping assembly comprising a chopping wheel and an anvil wheel, said first chopping assembly being secured to a chassis mounted so that it can move, particularly in rotation, about an articulation axle, said chassis is rotated about its axle until a second chopping assembly initially in a position of non-operation is brought into the vicinity of the strand, said second chopping assembly being secured to said chassis and comprising a chopping wheel and an anvil wheel, the second chopping assembly is set in operation and the strand is led in between the chopping wheel and the anvil wheel, said first chopping assembly is brought into the position of non-operation.

By using one of the chopping assemblies as a means for drawing out the strands throughout the phase of moving the chopping machine about its articulation axle it is possible to switch from one chopping assembly to the other without having to restart the strands.

In other preferred embodiments of the invention, recourse may also potentially be had to one and/or other of the following arrangements:

the strands are separated upstream of the first chopping assembly between two separating means, the strands are brought closer together between the two separating means, the strand is guided as the chassis rotates about its axle, this guidance being performed by guide means secured to said chassis, said chassis is always set in motion in the same direction, said chassis is set in rotation about a vertical axis.

According to another aspect of the invention, the latter is aimed at a chopping machine intended for the manufacture of chopped strands for technical use, particularly strands of thermoplastic and especially glass strands, said machine comprising a three-dimensional chassis having three sides or more, a first chopping assembly secured to one of the sides of said chassis comprising a chopping wheel and an anvil wheel, a second chopping assembly comprising a chopping wheel and an anvil wheel, said second chopping assembly being secured to one of the other sides of said chassis, said chassis being mounted so that it can move on an articulation axle, particularly an axle of rotation, characterized in that the chassis comprises guide means for guiding the strand which are designed to guide the strand in its path between the first chopping assembly and the second chopping assembly when said chassis is moved about its axle.

In other preferred embodiments of the invention, recourse may also potentially be had to one and/or other of the following arrangements:

the chassis is set in rotation about a vertical axis,
the chassis is a cube or a rectangular polyhedron,
the first chopping assembly and the second chopping assembly are positioned one on each side of an axis of symmetry of the chassis,
the first chopping assembly and the second chopping assembly are positioned respectively on adjacent sides of said chassis,
the first chopping assembly and the second chopping assembly are positioned respectively on parallel sides of said chassis,
the guide means are positioned upstream and downstream of the first and/or second chopping assemblies,
the guide means comprise rolls mounted so that they can move about a more or less vertical axis.

Other characteristics, details and advantages of the present invention will become better apparent from reading the description that will follow, given by way of entirely non-limiting illustration with reference to the attached drawings in which:

FIG. 1 is a simplified overall schematic view of an installation incorporating a chopping machine according to the invention, and FIGS. 2 to 8 illustrate the various steps in the process aimed at changing the chopping members, according to the procedures of the invention.

FIG. 1 therefore schematically shows an installation for producing chopped strands which comprises at least one bushing 1 fed, in the known way, with molten glass or glass beads delivered by a feed device, not depicted. These bushings, for example made of a platinum-rhodium alloy, are usually heated by resistance heating. They are provided on their underside with a plurality of orifices from which a plurality of filaments 2 (here some of them are depicted in chain line) can be mechanically drawn.

The filaments 2 generally undergo a sizing operation, that is to say a chemical treatment designed to apply to them a product that provides the strand with cohesion and sufficient lubrication and a capability to be subsequently used, in terms of processability and reinforcement/matrix compatibility, by means of a size applicator roller 3.

The filaments coming from a bushing are then combined by assembling rollers 4 into at least one strand 5 which is turned, via means such as a deflection or turn roll 6, so as to send them to a chopping machine 7 located downstream of the bushing 1.

Furthermore, the arrangement of the main components of the installation illustrated in FIG. 1 is such that the path of the filaments 2 then of the strands 5 lies generally in a vertical plane, from the bushing 1 as far as the chopping machine 7. More specifically, the filaments 2 lie firstly in an approximately vertical direction from the bushing to the deflection or turn roll 6, then the strands 5 follow a more or less horizontal path until they enter the chopping machine 7. A tensioning roll 10 may be provided at the entry to the machine so as to ensure that the strands are wrapped around an anvil wheel 9 of the chopping machine 7 over a sufficiently large arc to drive said strands by the friction force.

The bushing 1 and the size applicator roller 3 are placed one above the other, for example in one and the same fiberizing cell which stands on the floor on which the chopping machine stands.

The turn roll 6 lies vertically in line with the size applicator roller 3.

Thus, the filaments 2 follow a more or less vertical path from the bushing 1 to the turn roll 6 which deflects the strands through about 90° to bring them horizontally (or more or less horizontally) to the chopping machine 7.

The chopping machine 7 firstly comprises a blade-carrying wheel 8 (or chopping wheel) and the anvil wheel 9. Details about the construction of these wheels are given in the prior literatures particularly in publication EP 0 040 145. The chopping and anvil wheels are in contact with one another under slight pressure so that in the region of contact, which is also the chopping region, the deformation of the elastomer results in the blades of the blade-carrying wheel being flush. In practice, just one of the two wheels is driven, the other being driven upon contact therewith. As a preference, it is the blade-carrying wheel that is driven. The drive is conveyed by means of an electric motor (not shown), preferably with a direct drive via the hub of the wheel concerned.

The chopped strands 11 are collected in a receiving device 12. During the gaps in the chopping operation, particularly when a bushing is restarted, the strands are drawn by a drawing system 23, usually called a strand puller (cf. FIG. 1). The strands have to be drawn before the chopping operation begins or when a bushing is being restarted in order to establish steady-state operation of the bushing and therefore guarantee well-defined strand quality.

Under running conditions, the chopping machine 7, of which either the anvil wheel 9 and/or the blade-carrying wheel 8 is motorized, pulls on the strands.

According to a preferred embodiment, the chopping machine visible in FIG. 1 is in fact a multi-head chopping machine. FIGS. 2 to 8 are views from above of this chopping machine at various stages in the operating cycle. The multi-head chopping machine comprises at least two chopping assemblies (a first one C1 and a second one C2) which are separate and mounted on a chassis 13, the chassis being able to move in rotation about an axle 24 secured to a base positioned on the floor of the installation, this rotation axle 24 preferably being a vertical axle.

As a preference, the chassis can be inscribed within a cube or, more generally, within a rectangular polyhedron, and the chopping assemblies C1, C2 are positioned along an axis of symmetry of this chassis (in the example depicted, the axis of symmetry is the rotation spindle). In the example depicted in FIG. 2, each chopping assembly C1, C2 is positioned respectively on two sides or two parallel faces of the chassis. As an alternative (not depicted in the figures), the first and second chopping assemblies C1, C2 are positioned on adjacent sides of the chopping machine 7.

Figure 2:
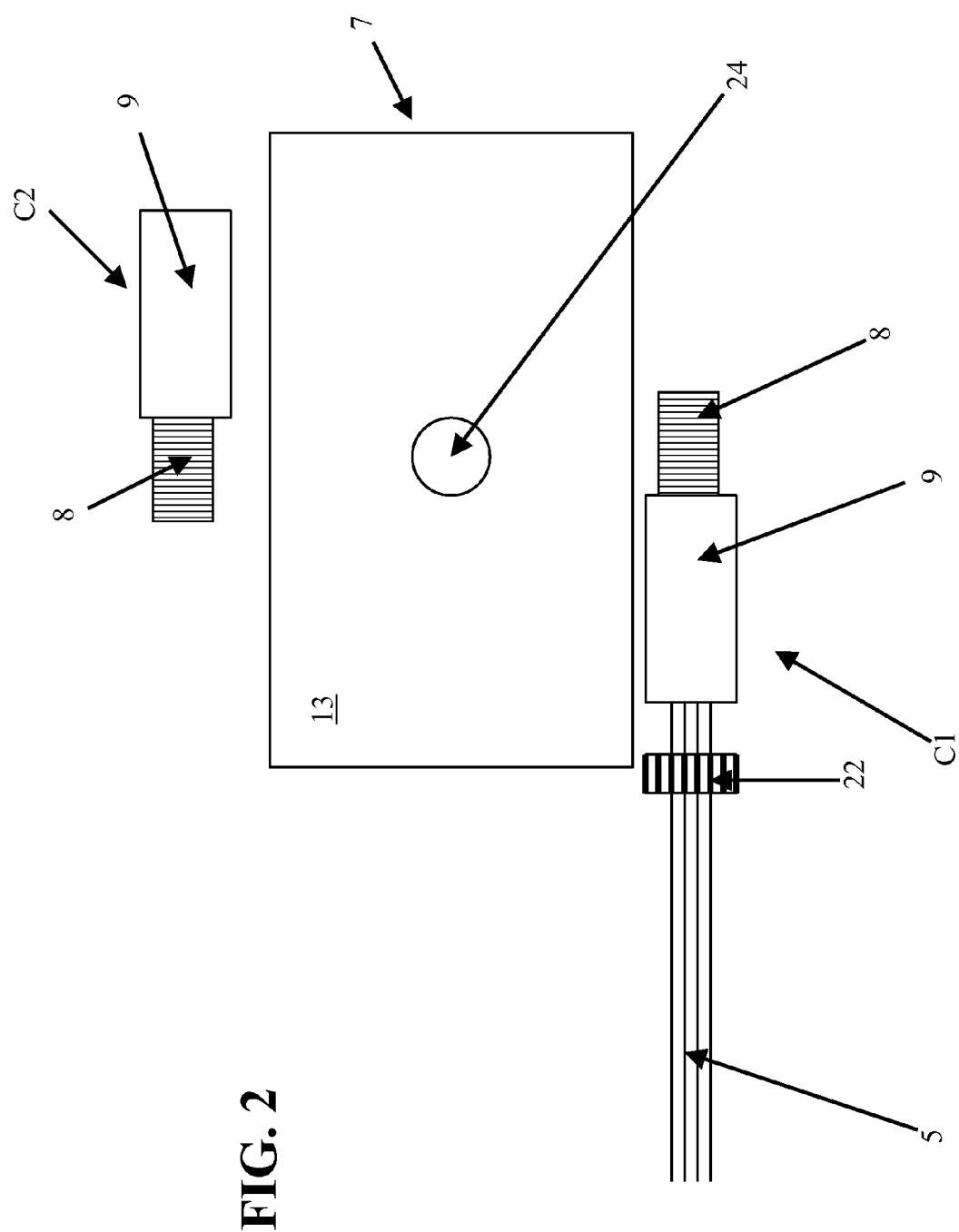

As can be seen in FIG. 2, a web of strands 5 from a bushing 1 or part of a bushing is drawn then chopped by a first chopping assembly C1 the strands 5 passing between the chopping wheel 8 and the anvil wheel 9 of this first chopping assembly C1 which is in the production position, these strands being guided from the deflection wheel 6 to the first chopping assembly C1 by a first separator 22. As can be seen in FIG. 2, the first separator 22 allows the strands 5 to be separated from one another and prevent them from occasioning chopping defects as they pass between the chopping wheel 8 and the anvil wheel 9.

When the chopping quality deteriorates, then the chopping members need to be changed using procedures that will be explained in detail hereinafter.

Figure 3:
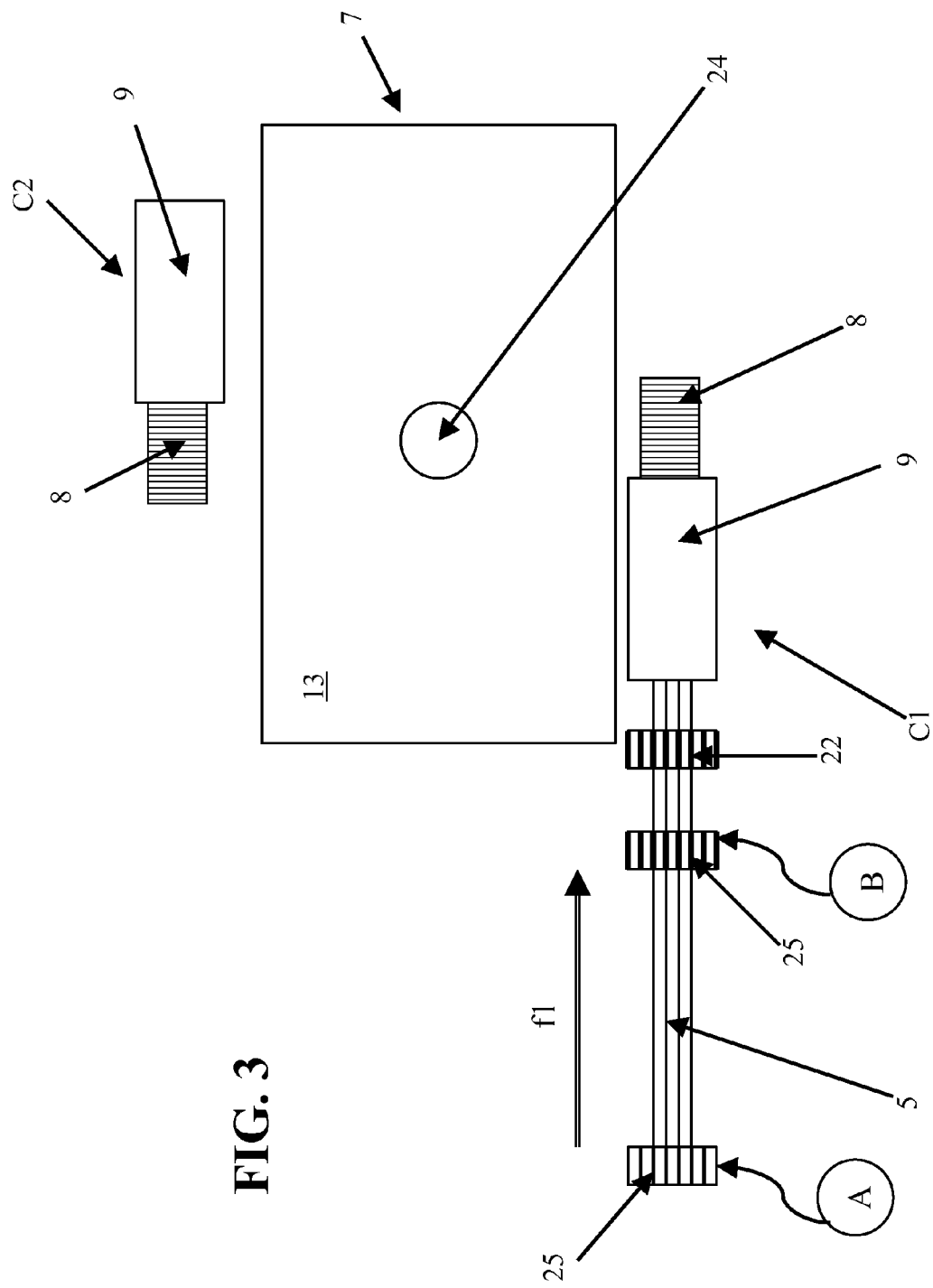

FIG. 3 illustrates a transient phase prior to the changing of the chopping tools.

Figure 4:
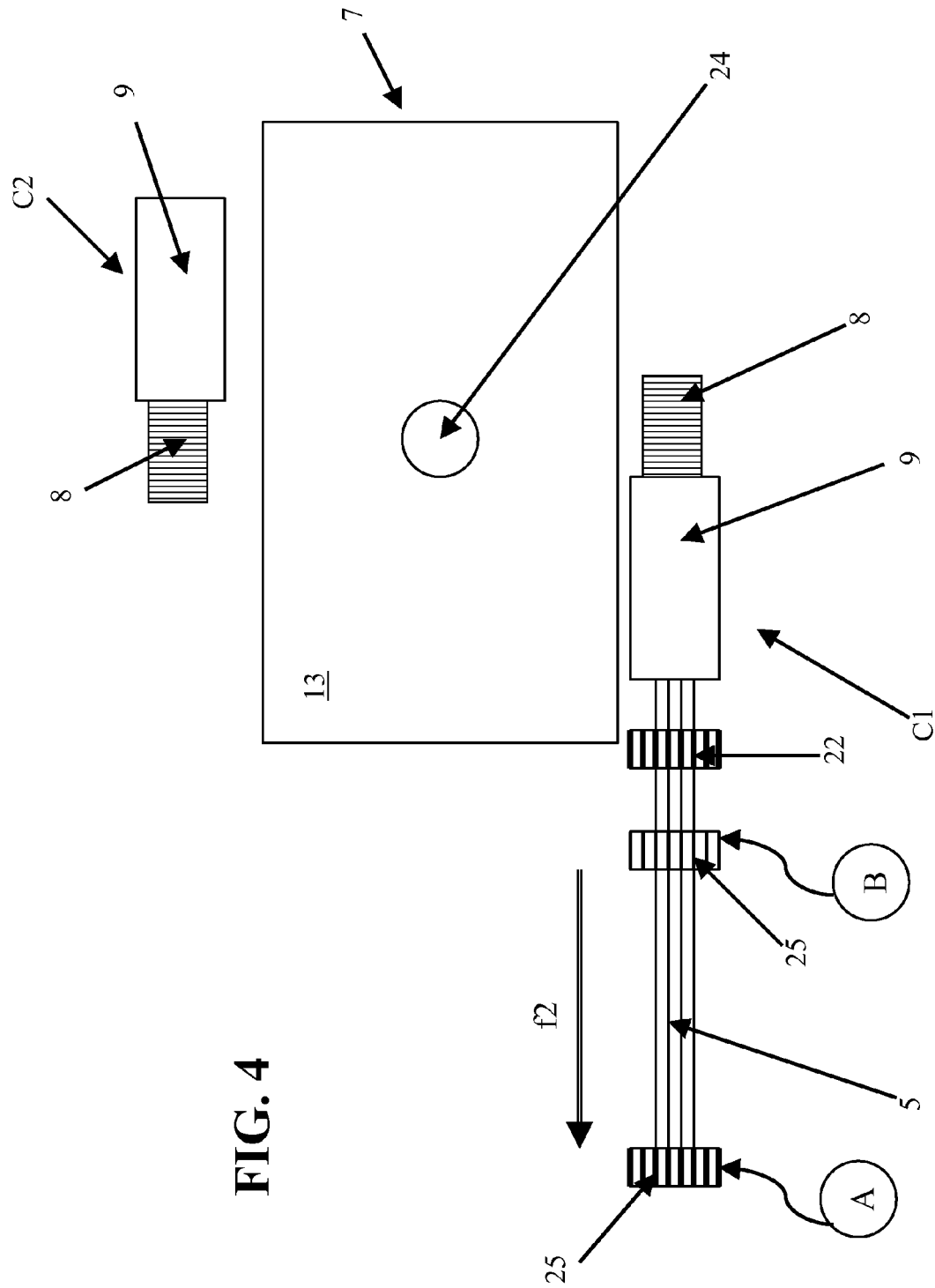

This FIG. 3 depicts a second separator 25 identical to the previous one. This second separator 25 is on standby and disengaged. It does not interfere with the path of the strands 5 exiting the bushings 1. Initially positioned upstream of the first separator 22 (position identified as A in FIG. 3), the second separator 25 is brought closer to the first separator 22 (position identified as B in FIG. 3) either manually or in a motorized manner (it may for example be mounted on an actuator), this approach movement (A, B) (in fact the separator 25 adopts a position B just ahead of the position occupied by the separator 22) is illustrated by an arrow f1. When the second separator 25 is in the upstream vicinity of the first separator 22 it is then engaged and interferes with the path of the strands 5. In FIG. 4, the second separator 25 moves away from the first separator 22 and returns to the position A it initially occupied (this movement is depicted by an arrow f2) in FIG. 3, although the second separator 25 remains engaged with the path of the strands 5 the same is true of the first separator 22.

In this configuration, the chopping machine 7 will be able to effect a rotational movement about its axle 24 as follows (reference may be made to the sequence in FIGS. 5-6-7-8). This rotation is performed in a known way, by any hydraulic, electrical, or pneumatic actuator, or manually if need be.

Figure 5:
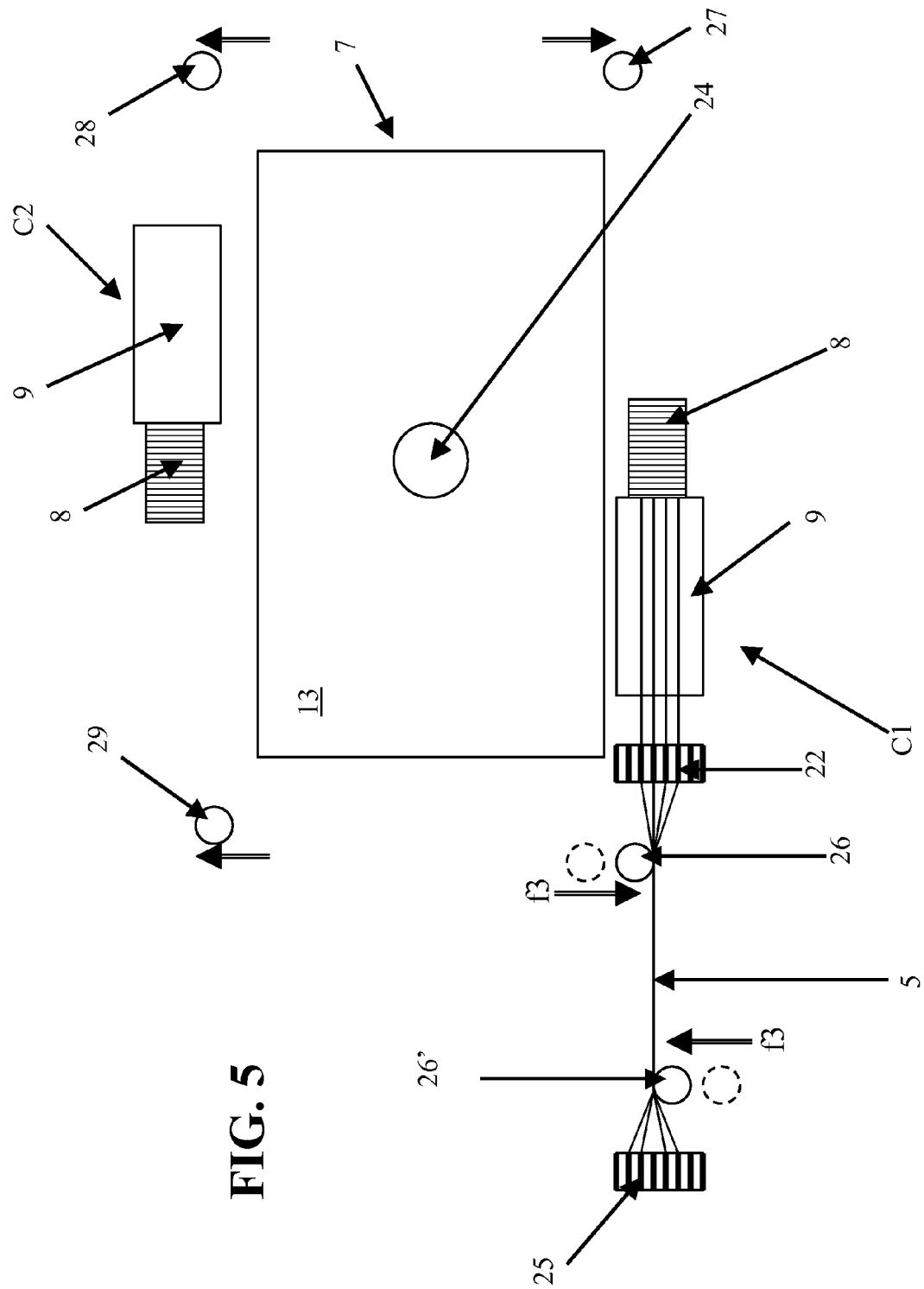

As can be seen from FIG. 5, before rotating the chopping machine 7 about its vertical rotation axle 24, two gathering means 26, 26' are simultaneously brought together, so as to collect or gather together the strands 5 running between the first separator 22 and the second separator 25, this bringing-together of the gathering means 26, 26' is illustrated by the arrows f3 (between a separated position illustrated in dotted line and a gathered-together position illustrated in solid line).

These gathering means 26, 26' secured to the chassis 13 consist for example of a roller or roll 26, 26' in the shape of a diabolo mounted so that it can move in terms of rotation on a vertical axle.

The gathering means 26' situated in close proximity to the second separator 25 also constitutes a guide means situated upstream of the first chopping assembly C1, the path of the strand 5 coming flush with the external surface of the roller 26'.

Other guide means 27, 28, 29 identical to the previously described rollers 26, 26' are positioned as can be seen from FIG. 5, downstream of the first chopping assembly C1 and upstream and downstream of the second chopping assembly C2, namely more or less at each of the corners of the chopping machine 7.

Figure 6:
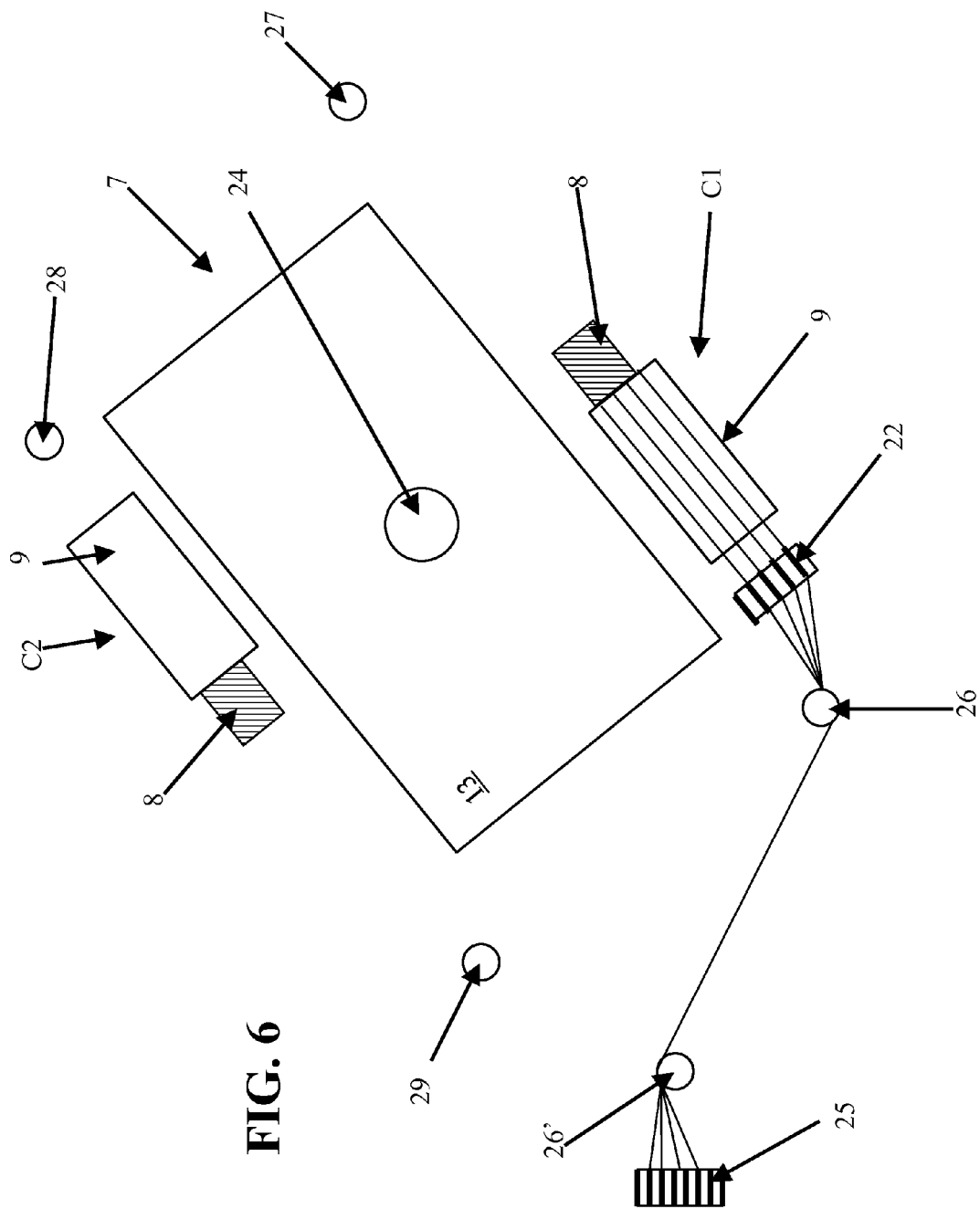

In FIG. 6, as the chopping machine 7 is rotated, the guide means 26, 27, 28, 29 (the rollers) each in turn take over the guidance of the strands 5, these continuing to be chopped by the first chopping assembly C1.

Figure 7:
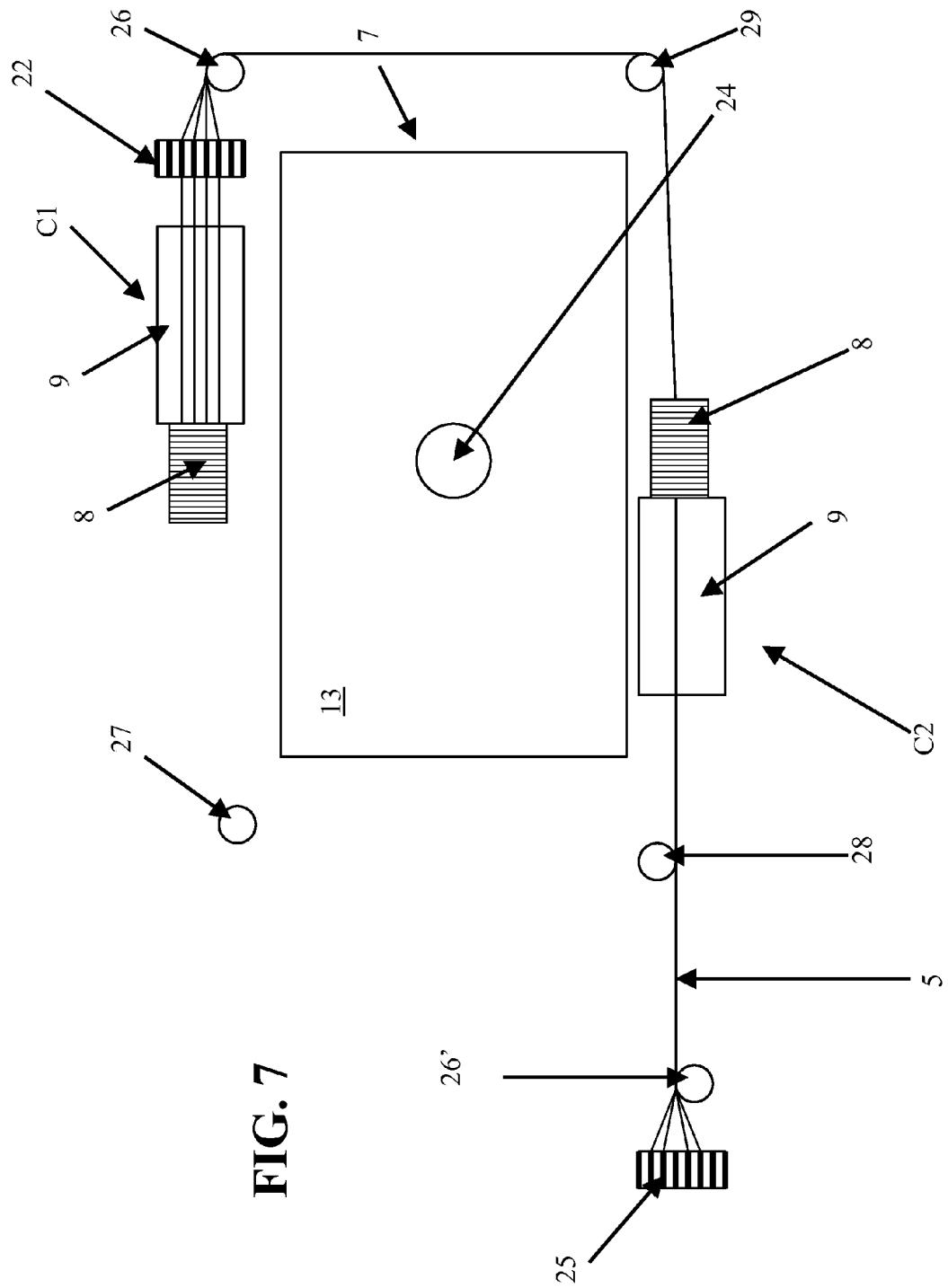

In FIG. 7, the chopping machine 7 has completely rotated about its rotation axle 24. The first chopping assembly C1 has taken the place of the second chopping assembly C2 and vice versa. The first chopping assembly C1 throughout the rotation of the chopping machine 7 is kept in operation and therefore continued to draw the strands 5 during the rotation process, these strands 5 also furthermore simultaneously being chopped and collected under the chopping machine 7.

The next step is to bring the second chopping assembly C2 into operation and automatically restart the strands on the second chopping assembly C2. This automatic restart phase is covered by a parallel patent application FR 04/52285 filed on Oct. 7, 2004 by the applicant company and to which reference should be made.

Figure 8:
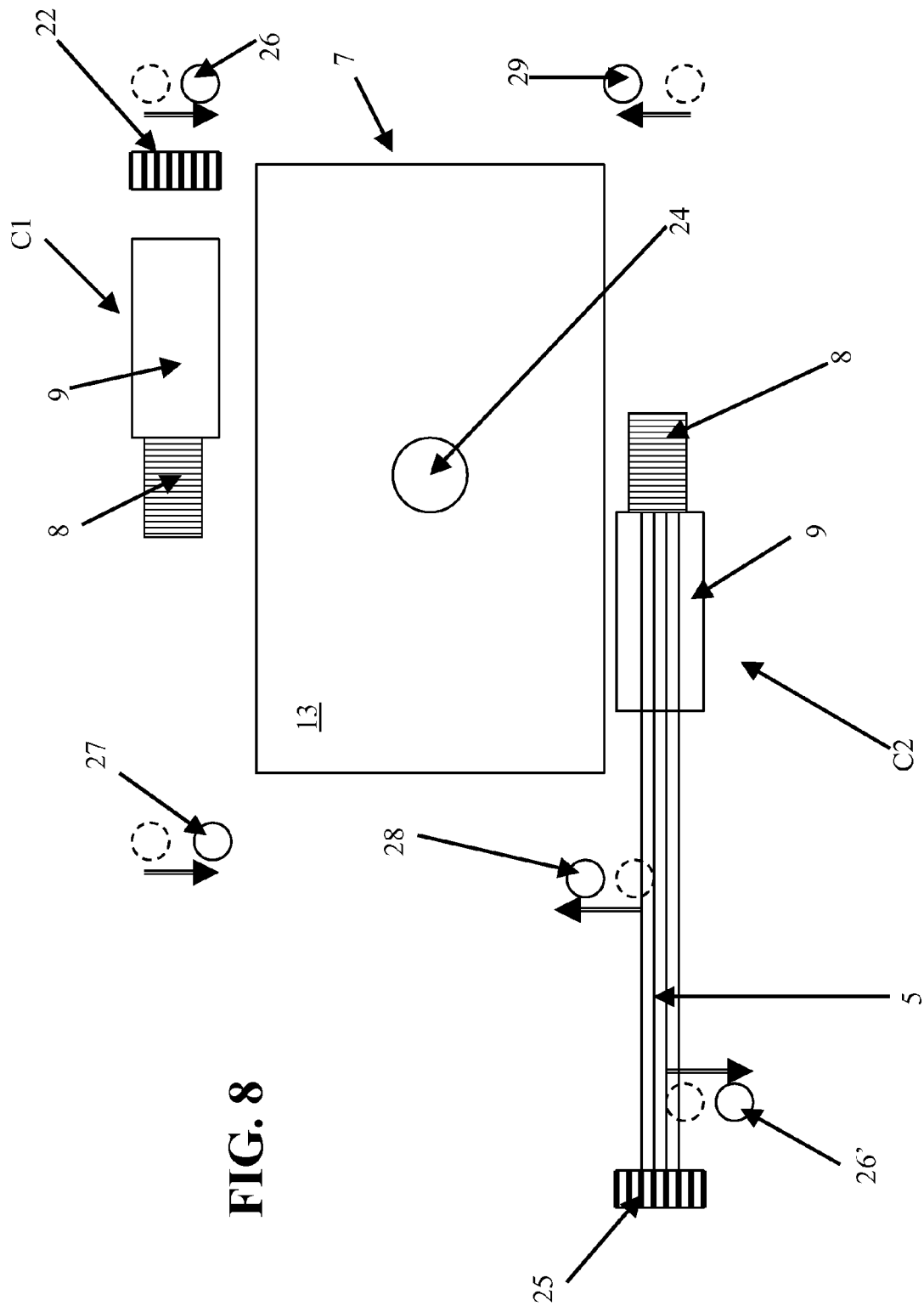

FIG. 8 depicts the installation after this automatic restart phase.

It will be noted that the strands 5 are now drawn and chopped by the second chopping assembly C2 and that the strands 5 are correctly separated, the gathering means 26', 28 having returned to their rest position, the position occupied by gathering means 26', 26 in FIG. 5.

The first chopping assembly C1 can then be taken out of operation so that a maintenance operation can be performed on it, it being possible for this for example to consist of a change of chopping members (anvil wheel 9 and/or chopping wheel 8).

As has been seen, the various steps in this process guarantee that work can be performed on the chopping machine without having to interrupt the production of the strands from the bushings, something that was not possible with double-head chopping machines known from the prior art, even the latter requiring some degree of scrapping while the machine was being rotated.

It goes without saying that the invention as previously described has been illustrated on the basis of a mode of operation that includes rotating the chopping machine about one of its axes of symmetry (in this instance a vertical rotation axle). It will therefore be understood that this invention also comprises modes of operation whereby the rotation about an axis can be broken down into a combination of elementary movements including translational movements, rotational movements during which the strand(s) from the bushings will pass without breakage from a first chopping assembly to a second chopping assembly, amounting to a mode of operation equivalent to the one illustrated by FIGS. 2 to 8. Thus, in a variant embodiment, the chopping machine may perform a circuit in the shape of a square.

According to yet another variant embodiment, the chopping machine equipped with these two chopping assemblies is placed on a runway track along which it can move as far as a turntable designed to allow it to make a half-turn, so as to switch the first chopping assembly from an operating position to a maintenance position and vice versa in respect of the second chopping assembly (which is switched from a maintenance position to an operating position). Once the half-turn has been effected, the chopping machine, by moving in the opposite direction along the runway track, returns to its initial position.

Furthermore, the automatic switchover of the strands from a first chopping assembly to a second chopping assembly without the need to interrupt production or, more precisely, without the need to send the production for scrap, is highly economical in terms of human intervention: in theory, all of the steps can be managed by a single operator, something which was not the case with double-head chopping machines known from the prior art. The strands chopped during this maintenance phase can be collected and used for profit.

The invention claimed is:

1. A method enabling a maintenance intervention to be carried out on a chopping machine, the method comprising:
   drawing a strand through a first chopping assembly in operation, the first chopping assembly including a first chopping wheel and a first anvil wheel, the first chopping assembly being secured to a chassis mounted to move about an articulation axle;
   separating a portion of the strand upstream of the first chopping assembly to form a first separated strand portion;
   chopping the first separated strand portion in the first chopping assembly;
   gathering a portion of the first separated strand portion to form a gathered strand portion prior to movement of the chassis;
   moving the chassis about said articulation axle until a second chopping assembly initially in a position of non-operation is brought into a vicinity of the gathered strand portion, the second chopping assembly being secured to the chassis and including a second chopping wheel and a second anvil wheel, wherein the strand remains drawn through the first chopping assembly in operation during movement of the chassis;
   setting the second chopping assembly in operation and leading the gathered strand portion in between the second chopping wheel and the second anvil wheel;
   separating the gathered strand portion upstream of the second chopping assembly to form a second separated strand portion;
   chopping the second separated strand portion in the second chopping assembly; and
   bringing the first chopping assembly into the position of non-operation,
   wherein the chopping of the first separated strand portion continues throughout the movement of the chassis.

2. The method as claimed in claim 1, wherein the strand is separated upstream of the first chopping assembly between two separating mechanisms, and
   wherein the gathered strand portion is formed between the two separating mechanisms.

3. The method as claimed in claim 1, wherein the gathered strand portion is guided by a guide as the chassis rotates about said articulation axle, the guide being secured to the chassis.

4. The method as claimed in claim 1, wherein the chassis always moves in the same direction.

5. The method as claimed in claim 1, wherein said articulation axle defines a vertical axis, and wherein said moving the chassis about said articulation axle comprises rotating the chassis about said vertical axis.

* * * * *